United States Patent [19]

Matsumoto

[11] 4,095,241
[45] June 13, 1978

[54] PHOTO-SENSING CIRCUIT

[75] Inventor: Seiichi Matsumoto, Yokohama, Japan

[73] Assignee: Canon Kabushiki Kaisha, Tokyo, Japan

[21] Appl. No.: 637,460

[22] Filed: Dec. 3, 1975

Related U.S. Application Data

[63] Continuation of Ser. No. 459,216, Apr. 8, 1974, abandoned.

[30] Foreign Application Priority Data

Apr. 11, 1973  Japan .................... 48-40999

[51] Int. Cl.² ............... G03B 7/08; G01J 1/42
[52] U.S. Cl. .................... 354/31; 354/43; 354/50; 356/222
[58] Field of Search ............ 354/31, 23, 43, 50, 354/51, 60 R; 356/222; 250/208-209, 578

[56] References Cited
U.S. PATENT DOCUMENTS

| | | | |
|---|---|---|---|
| 3,781,119 | 12/1973 | Mori | 354/31 |
| 3,850,530 | 11/1974 | Uno et al. | 354/31 |
| 3,852,774 | 12/1974 | Taguchi et al. | 354/31 |

*Primary Examiner*—L. T. Hix
*Assistant Examiner*—M. L. Gellner
*Attorney, Agent, or Firm*—Toren, McGeady and Stanger

[57] ABSTRACT

The photo-sensing circuit of the present invention has output characteristics which are linear for a wider range than that of a conventional photo-sensing circuit. In this invention the amount of incident light of the photographing field which is to be sensed is converted to an electric signal by a photo-electromotive element. A photo-conductive element, having its resistance value varied corresponding to the amount of incident light from the photographing field which is sensed, is connected as a load resistance to the above mentioned photo-electromotive element. Therefore the saturation level of the output characteristics of said photo-electromotive element varies corresponding to the amount of incident light into the photo-conductive element.

7 Claims, 7 Drawing Figures

PHOTO-SENSING CIRCUIT

This is a continuation of application Ser. No. 459,216 which was filed Apr. 8, 1974 now abandoned.

BACKGROUND OF THE INVENTION

1. Field of the Invention

The present invention is related to a photo-sensing circuit used in a camera, etc., particularly to a photo-sensing circuit employing a photo-electromotive element.

2. Description of the Prior Art

Recently, photoelectromotive elements such as a selenium photocell, a silicon photo-cell, etc. are used as a light receiving element of the photo-sensing circuit of a camera.

Said photo-electromotive element has the shortcoming that its linear output characteristic range becomes narrow because of the load resistance connected to said element. Otherwise it has various good characteristics, such as small temperature variation, small changes due to aging, etc.

Thus a device having an element with the resistance value of the load resistance connected thereto being made virtually zero, eliminating the above mentioned shortcoming of the conventional device, was disclosed in British Pat. No. 1,293,771.

But, the circuit in such a device has other shortcomings that its function becomes unstable because of the variation in ambient temperature as the resistance value of the load resistance is almost zero, and that since the load resistance of the photo-electromotive element is made almost zero, a computation amplifier is used. Accordingly the system of the device becomes complicated and costs high.

An object of the present invention is to provide a photo-sensing circuit in which the above mentioned shortcomings of conventional devices are eliminated.

Another object of the present invention is to provide a photo-sensing circuit in which a photo-conductive element is used as the load resistance of the photo-electromotive element.

Still further objects of the present invention will become apparent by the detailed explanations of the invention which will be given below in reference to the drawings.

DESCRIPTION OF THE PRESENT EMBODIMENTS

Figure 1:
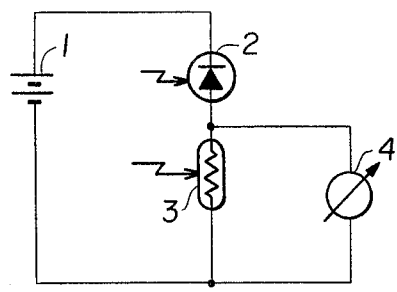
FIG. 1 is a schematic drawing to explain the principle of the photo-sensing circuit of the present invention.

The present invention will now be explained referring to the drawings. FIG. 1 is a theoretical connection diagram of the photo-sensing circuit of the present invention, wherein 1 is a power source battery, 2 is a photo-electromotive element, for example a silicon photo-cell, a silicon photo diode, etc., 3 is a photo-conductive element such as CdS, CdSe, etc. 4 is a meter connected to the output terminal of a photo-sensing circuit to indicate the photo-sensed value.

Next the function of this circuit will be explained. When the light to be sensed is incident into said circuit, the photo-conductive element 3 shows such resistance value as corresponding to the brightness of said incident light and the photo-electromotive element 2 provides a voltage which corresponds to said brightness of the incident light. Now the function of the circuit shown in FIG. 1 will be explained using FIG. 2. When the brightness of the incident light is up to $E_1$, the value of current flowing to the current path of the meter 4 linearly varies with the brightness of the incident light as shown by a-b. Now the resistance value of the photo-conductive element 3 at the time of brightness $E_{1a}$ is expressed by $R_{pc}$. When a resistance with said resistance value is connected as the load resistance of the photo-electromotive element 2, the output current of the photo-sensing circuit will be placed in a saturated state after the brightness $E_{1a}$ as shown by a curve 1, and the output characteristics will be non-linear. But in the present invention, when the brightness of the incident light exceeds $E_{1a}$, the resistance value of the photo-conductive element 3 is lowered corresponding to the brightness of said incident light. Therefore its output characteristics will not be varied as the curve 1, instead it varies as shown by a curve 2. That is the output characteristics will be linear as b-c. As the resistance value of the photo-conductive element 3 in the incident light brightness range of $E_{2a}$-$E_{3a}$ will become still smaller, the output current will vary linearly as shown by c-d. While FIG. 2 does not show the case when the incident light brightness is higher than $E_{3a}$, the output characteristics will not be saturated because of the above mentioned reason, instead will be varied linearly by the same reason.

Figure 3:
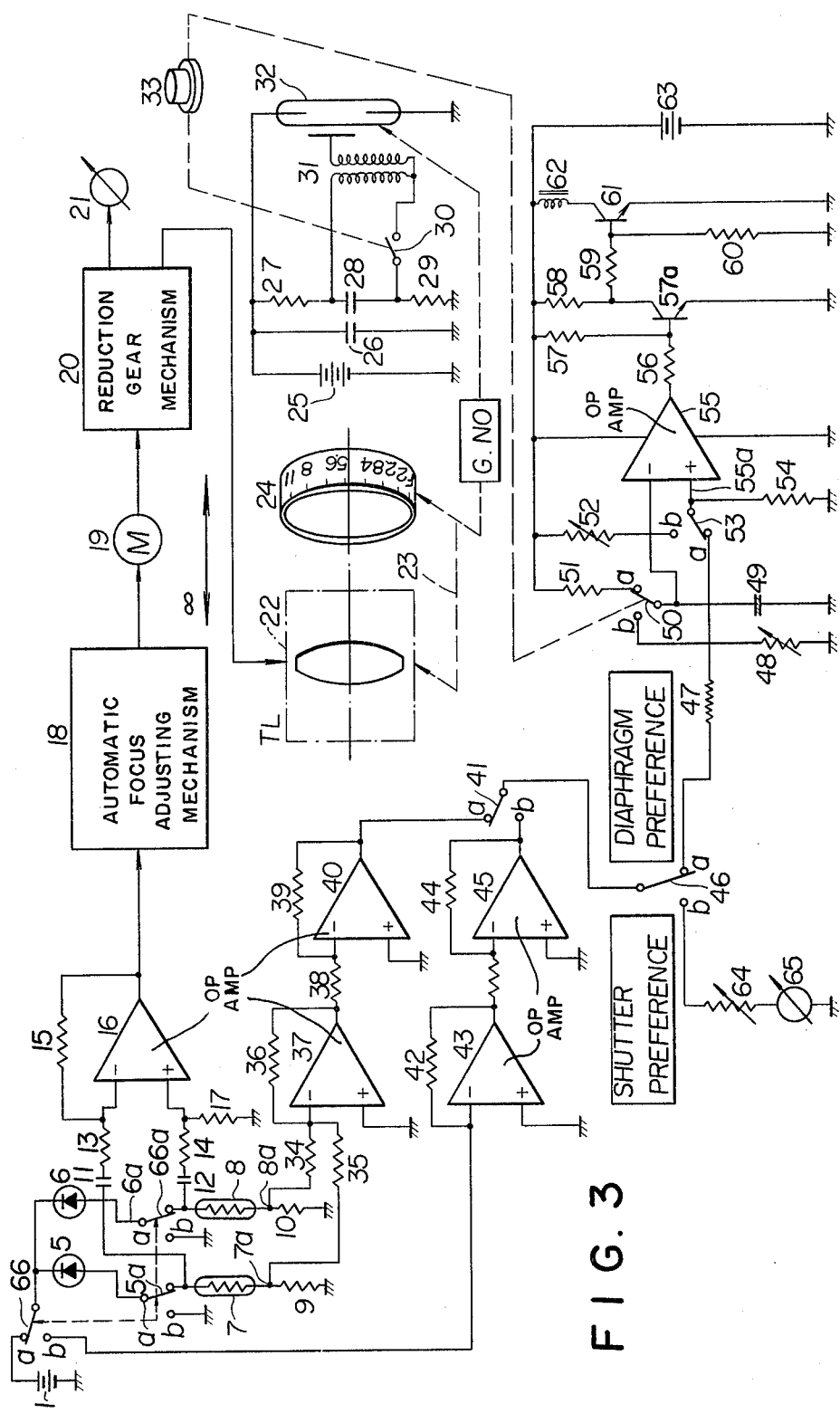
FIG. 3 is a circuit connection diagram to show an example of a case when the present invention is used in various controls of a camera.

FIG. 3 is a drawing for arrangement of important parts of an example in which the photo-sensing circuit of the present invention is applied to a camera. In the drawing, 1 is a power source, 5, 6 are photo-electromotive elements. 7, 8 are photo-conductive elements. 9, 10 are resistors. 66 is a change over switch which has its movable contact 66a connected to "b" side when the object brightness is in low brightness range, and is connected to "a" side when it is in middle or high brightness range. The photo-sensing circuit is composed of elements 1, 5 to 10. 11, 12 are condensors to block the direct current element of the output current of the photosensing circuit. 13 to 15 and 17 are resistors. 16 is a computation amplifier and is composed of a differential type amplifier including elements 13 to 17. 18 is an automatic focus adjusting mechanism known by, for example, German Application 2,126,178 which has been laid open to the public. 19 is a motor connected to the output of said focus adjusting mechanism. 20 is a reduction gear mechanism. 21 is a meter to indicate the distance to an object. 22 is a photographing lens. 23 is a coupling member to mechanically couple a focussing ring 24 of a camera and the above mentioned lens 22. 25 is a power source. 26 is a condensor to accumulate energy for illumination. 27, 29 are resistors to divide the voltage of said power source 25. 28 is a triggering condensor. 30 is a synchronizing contact linked with a release button 33 of the camera. 31 is a pulse transformer. 32 is a flash discharge tube to emit flash. 43 is a computation amplifier. 42 is resistor, and a voltage follower circuit for converting the current to voltage is formed by 42, 43. 44 is a resistor. 45 is a computation amplifier and an inversion amplifier circuit is provided by elements 44 and 45. 34, 35, 36 are resistors. 37 is a computation amplifier and a differential type amplifier is formed by elements 34 to 37. 38, 39 are resistors and 40 is a computation amplifier, and an inversion amplifier is formed by elements 38 to 40. 41 is a change over switch. 46 is a change over switch which is connected to "*a*" side in diaphragm preference photographing and is connected to "*b*" side in shutter time preference photographing. 47 is a resistor for current adjustment. 48 is a variable resistor. 49 is a condensor and a time constant circuit is formed by elements 48, 49. 50 is a change over switch. 51 is a resistor. 52 is a resistor to set flash photographing shutter time. 53 is a change over switch. 54 is a resistor. 55 is a computation amplifier. 56, 57 are resistors connected to the base of the transistor 57a. 58 to 60 are resistors. 61 is a transistor connected to a magnet 62 for controlling the opening and closing of a shutter. 63 is a power source to supply voltage to a shutter time control circuit consisting of 47 to 62. 64 is a variable resistor with its resistance value varied by setting of shutter speed value. 65 is a meter to indicate the diaphragm aperture value.

The above mentioned photo-electromotive element and the photo-conductive element are arranged as will be explained below.

Figure 4A:
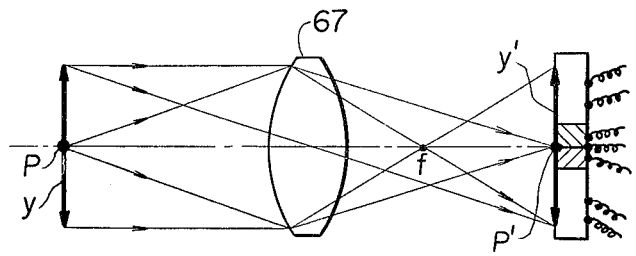
FIGS. 4a, 4b and FIG. 5 are drawings for an arrangement of important parts showing an optical system used in the photosensing circuit of the present inventions.
Figure 4B:
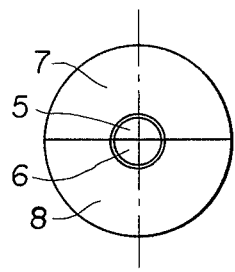
Figure 5:
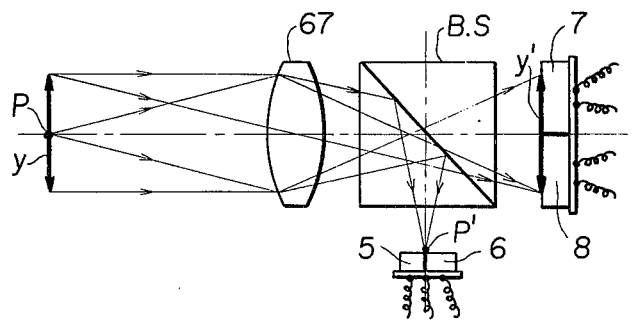

FIGS. 4 and 5 are schematic drawings to show examples of a lens optical system used in the photo-sensing circuit of the present invention, wherein FIG. 4(a) shows a case when the photo-electromotive element and the photo-conductive element are placed on a same plane, while FIG. 5 shows the case when they are placed at the positions forming a right angle to each other using a beam splitter. In FIG. 4, L is a lens system, 5, 6 are photo-electromotive elements, 7, 8 are photo-conductive elements and are placed on a same plane being insulated from each other as shown in the drawing. Y is an object. P is an infrared ray spot which is projected on an object from an infrared ray projector which is not shown in the drawing. Y' is an image of Y at photo-sensing element plane. P' is an image of said infrared ray spot.

Next, FIG. 4(b) is a lay-out of the photo-electromotive element and the photo-conductive element of FIG. 4(a). In this FIG. 4(b), the circular part at center, which is divided into two parts, are photo-electromotive elements 5, 6, and the doughnut shape part surrounding said circular part are photo-conductive elements 7, 8. These elements are electrically insulated from each other and are arranged in such size as suitable for receiving incident light being electrically insulated from each other. FIG. 5 is a schematic drawing to show another example of the optical system in the device of the present invention, wherein a beam splitter B.S. is placed between a lens system 67 and the light receiving element to divide the incident light into two optical paths for detecting the same. In this drawing the photo-conductive elements 7, 8 and the photo-electromotive elements 5, 6 are placed at such imaging positions as being at equal distance from the beam splitter B.S.

Now the function of the device having the above mentioned set up will be explained.

(a) Daylight photographing

Figure 2:
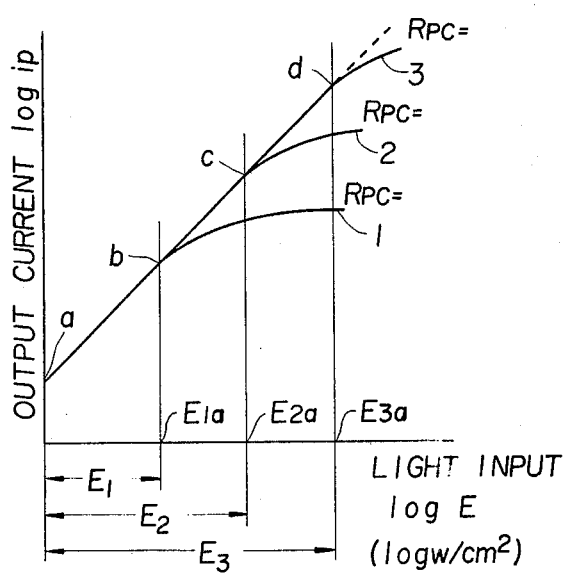
FIG. 2 is a characteristics curve diagram to explain the function of the photo-electromotive element and the photo-conductive element of the photo-sensing circuit of the present invention.

First change over switches 41, 46, 53, 66 are connected to "*a*" side as shown in FIG. 3. When the camera is pointed toward an object (not shown in the drawing) and photo-sensing is started, such resistance value which corresponds to the amount of incident light from the object will be shown by the photo-conductive elements 7, 8, while the photo-electromotive elements 5, 6 output such voltage which corresponds to the amount of incident light. The current outputted by the output terminals 7a, 8a of the photosensing circuit will be added at the amplifier 37. The output current varies against the amount of incident light as shown in FIG. 2. The added output current mentioned above has its polarity inverted by the inversion amplifier 40. Now as the change over switch 46 is connected to "*a*" side, in the case of diaphragm preference photographing, the output from the above mentioned amplifier 40 is supplied to into the amplifier 55.

After that occurs, as the shutter button 33 is pressed, the change over switch 50 is changed over from "*a*" side to "*b*" side in association with said button pressing. Before said button pressing, electric charge is supplied to the condensor 49 from the power source 63 through the change over switch 50. Therefore when this button 33 is pressed, the terminal voltage of the condensor 49 will have a prescribed level. As the change over switch is changed over to "*b*" side, the electric charge of the condensor 49 is discharged through the resistor 48. Also the front screen of shutter is activated in association with the pressing of a release button 33, and shutter is opened. The voltage of the condensor 49 will be gradually lowered corresponding to the time constant factor of a time constant circuit consisting of the condensor 49 and the resistor 48. And as the voltage of the condensor 49 becomes equal to the voltage of the input terminal 55a of the amplifier 55a, the transistor 57 becomes OFF, and by this the transistor 61 becomes ON and current flows to the magnet 62. When a checking member (not shown in the drawings) holding the rear screen (not shown in the drawings) is activated by the magnet 62 the rear screen runs and shutter is closed, thus exposure is completed.

When shutter preference photographing is done, the change over switch 46 is changed over to "*b*" side. By this the output of the amplifier 41 is supplied to the meter 65 to indicate the appropriate diaphragm aperture value. Shutter time information is set at the resistor 64. When the shutter release button 33 is pressed, the position of the pointer of the meter 65 is detected by a known type of a saw teeth mechanism (not shown in the drawing) and a diaphragm aperture value corresponding to the indication of the meter 65 is set at the camera. Also at the same time as the pressing of the release button, the shutter is opened by a known type of an electronics shutter circuit (not shown in the drawing) for the length of time as the shutter time set at the resistor 64, and after a prescribed length of time it is closed, thus exposure is completed.

When the object brightness is low, the change over switches 41, 66 are changed over to the "*b*" side. As the output from the photo-electromotive elements 5, 6 are supplied, by this, to the amplifier 43, an appropriate exposure can be obtained even in a low brightness.

(b) Flash photographing

In the case of flash photographing, the change over switch is changed over to the "b" side. The photoconductive elements 7, 8 are so set as to be responsive to visible light zone but are not responsive to infrared ray zone. On the other hand, the photo-electromotive elements 5, 6 are so set as to be responsive to the zone including the visible light zone to the infrared ray zone.

As reflected luminous flux is incident on the elements 5 to 8 from an object, such output current as corresponds to the amount of incident light is obtained from between the output terminals 5a and 6a of the photosensing circuit. Of course this output current varies against the amount of incident light as shown in FIG. 2. Infrared ray is projected on an object from an infrared ray projector which is not shown in the drawing. The infrared ray flux reflected from said object passes through the photographing lens 67 as shown in FIG. 4 and is incident on the light receiving elements 5 to 8. As the photo-conductive elements 7, 8 do not respond to the infrared ray, said incident ray flux is detected by the photo-electromotive elements 5, 6. Therefore, the output between the output terminals 5a–6a of the photosensing circuit will become such a current value corresponds to the amount of the visible ray and the amount of the infrared ray. Said current passes through the condensors 11, 12 for blocking direct current element, and current with such alternate current element as corresponding to the amount of infrared ray is supplied from the differential amplifier 16.

When the photographing lens 67 is not focused, such current as corresponding to the difference of the amount of infrared ray on the elements 5, 6 will be provided by from the above mentioned amplifier 16.

By this output current, the automatic focus adjusting mechanism 10 drives the motor 19. (As explanations are given on said automatic focus adjusting mechanism in German Application 2,126,178 detailed description of the same is omitted here). The reduction gear mechanism is driven by the rotation of said motor 19 and the resistor (not shown in the drawing) connected to the meter 21 is made variable by the reduction gear mechanism 20, and the meter 21 indicates the amount of rotation of the motor 19, that is the distance information to the object. The reduction gear mechanism 20 also drives the photographing lens 22 for a camera. As this photographing lens 22 is shifted the infrared ray spot image P'(shown in FIG. 4) is shifted on the element planes 5, 6 corresponding to the amount of said shifting. As a result the amount of infrared ray on the elements 5, 6 varies and the amount of such variation is detected by the differential amplifier 16, while the automatic focus adjusting mechanism 18 drives again the photographing lens 22 according to thus detected amount. Since same amount of infrared ray will be incident onto the elements 5, 6 when the photographing lens is focused as a result of the above mentioned actions, the output current of the amplifier 16 becomes zero and the rotation of the motor M is stopped. As a result; the focussing ring 24 is adjusted to a position corresponding to the distance to the object, and also the guide number of the flash device takes a value corresponding to the distance to the object.

Next as the shutter release button is pressed the shutter is opened, as in the case described above and the synchronizing contact 29 is closed at the same time, thus electric charge is supplied from the condensor 26 to the discharge tube 32 and the flash discharge tube emits flash by which the object is illuminated. On the other hand the change over switch 50 is changed over to the "b" side by the pressing of the release button 33 and the condensor 49 which has been charged to a prescribed voltage is discharged through the resistor 48. As the terminal voltage of said condensor 49 drops to the bleeding point potential of the bleeders 52, 54 after an elapse of a prescribed period of time the transistor 57 is placed on OFF state by the comparator 55 while the transistor 61 is placed on ON state. As the transistor 61 becomes ON, the magnet 62 is placed in an excited state making the rear screen of shutter to run, thus exposure is completed. The opening time of shutter is adjusted by varying the resistor 52.

Figure 6:
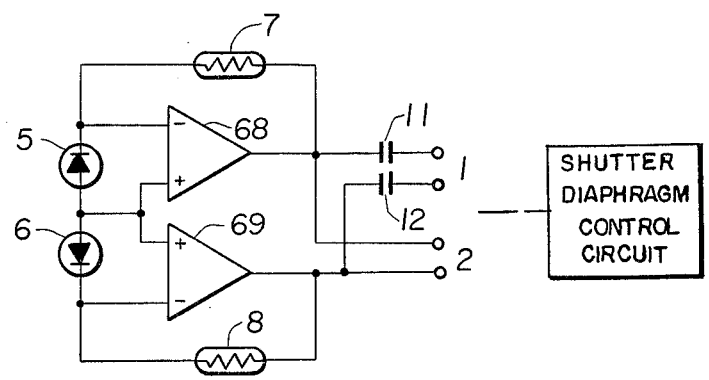
FIG. 6 is a circuit connection diagram to show another example of the present invention.

FIG. 6 is a circuit connection diagram to show another example of the present invention. The same elements as shown in FIG. 3 are identified by same numbers and marks. In the drawing, 68 and 69 are computation amplifiers, wherein the photo-electromotive elements 5, 6 are connected between the inversing input terminal and non-inverting input terminal of the amplifiers 68, 69, and the photo-conductive elements 7, 8 are connected to the feed-back circuit of the amplifiers 68, 69, respectively. In this drawing, the photo-electromotive element employs, for example, a silicon photodiode, etc. to detect the light in infrared zone which is reflected from an object while the photo-conductive element employs, for example, CdS, etc. to detect the brightness of an object as in FIG. 3. The output of the computation amplifier is divided into the output 1 having its direct current element blocked by the condensors 11, 12 and the output 2 which contains the direct current element, and the distance information can be obtained by the output 1 while the brightness information can be obtained by the output 2. Therefore automatic focusing and automatic exposure control, etc. of a camera can be done using these parts as in the example shown in FIG. 5.

As has been explained above the linear characteristics of the output characteristics of the photo-electromotive element in the photo-sensing circuit according to the present invention is effectively expanded by the photo-conductive element which functions as the load resistance of the former element. Especially in the case of the present invention as such load resistance as corresponding to the object brightness is connected to the photo-electromotive element in a low and middle brightness zone, the device will not receive the effect of the ambient temperature in said zone being different from the device of British Pat. No. 1,293,771.

While such example was shown in the above explanations that photo-electromotive element and photo-conductive element are connected in series, the photo-electromotive element and the photo-conductive element may be connected in parallel.

What is claimed is:

1. A circuit for detecting an amount of incident light, comprising;
    an operational amplifier having a feedback path connected between its output and input terminals for amplifying an electrical input signal and producing an electrical output in response thereto;
    photo-electromotive means connected between the input terminals of said operational amplifier for supplying said operational amplifier with the electrical input signal corresponding to the amount of incident light thereon;

photo-conductive means provided in the feedback path of said operation amplifier for reducing the load resistance of said photo-electromotive means corresponding to the increase of the amount of incident light thereon, said photoconductive means being provided for expanding the measuring range of said circuit; and an electrical output terminal connected to said amplifier means.

2. A circuit according to claim 1, wherein said photo-electromotive means includes a silicon photo-voltaic cell.

3. A circuit according to claim 1, wherein said photo-electromotive means includes a silicon photo diode.

4. A circuit according to claim 1, wherein said photo-conductive means comprises a cadmium sulfide cell.

5. A circuit according to claim 1, wherein said electrical output terminal includes capacitor means to block direct current and to pass an alternating current component of the amplifier output.

6. An exposure control device for a camera comprising:

a photo-sensing circuit including:
an operational amplifier having a feedback path connected between its output and input terminals for amplifying an electrical input signal and producing an electrical output signal in response thereto;

photo-electromotive means connected between the input terminals of said operational amplifier for supplying said operational amplifier with an electrical signal corresponding to the amount of incident light thereon, said means providing a lowered output above a predetermined level of incident light;

photo-conductive means provided in the feedback path of said operation amplifier for reducing the load resistance of said photo-electromotive means corresponding to the increase of the amount of incident light thereon, said photo-conductive means being provided for expanding the measuring range of said circuit; and a shutter opening time control circuit coupled to the electrical output of said photo-sensing circuit output, wherein said circuit sets the shutter opening time corresponding to the output of said photo-sensing circuit.

7. An exposure control device for a camera comprising:

a photo-sensing circuit including:
an operational amplifier having a feedback path connected between its output and input terminals for amplifying an electrical input signal and producing an electrical output signal in response thereto;

photo-electromotive means connected between the input terminals of said operational amplifier for supplying said operational amplifier with an electrical signal corresponding to the amount of incident light thereon, said means providing a lowered output above a predetermined level of incident light;

photo-conductive means provided in the feedback path of said operation amplifier for reducing the load resistance of said photo-electromotive means corresponding to the increase of the amount of incident light thereon, said photo-conductive means being provided for expanding the measuring range of said circuit; and a diaphragm aperture control circuit connected to the output of the photo-sensing circuit, wherein said circuit sets the diaphragm aperture according to the output of said photosensing circuit.

* * * * *